O. H. MENNING.
VEHICLE.
APPLICATION FILED MAY 20, 1918.
1,308,636.
Patented July 1, 1919.
2 SHEETS—SHEET 2.
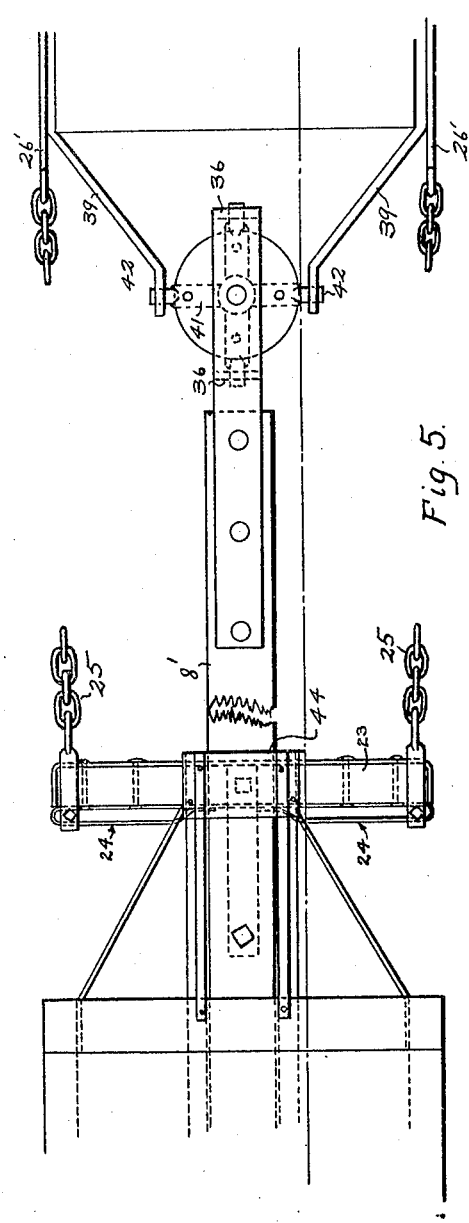
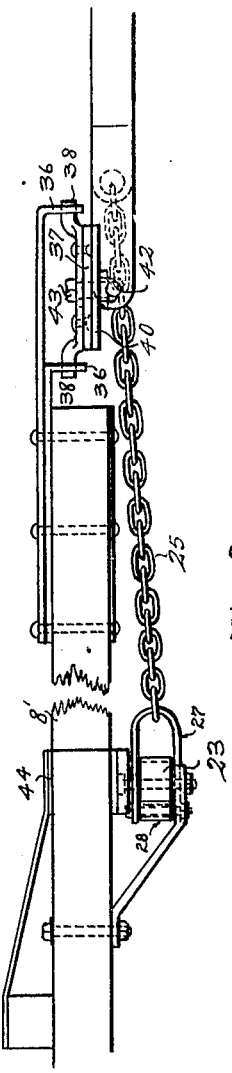
INVENTOR
Otto H. Menning
BY
Hardway Rathey
ATTORNEYS

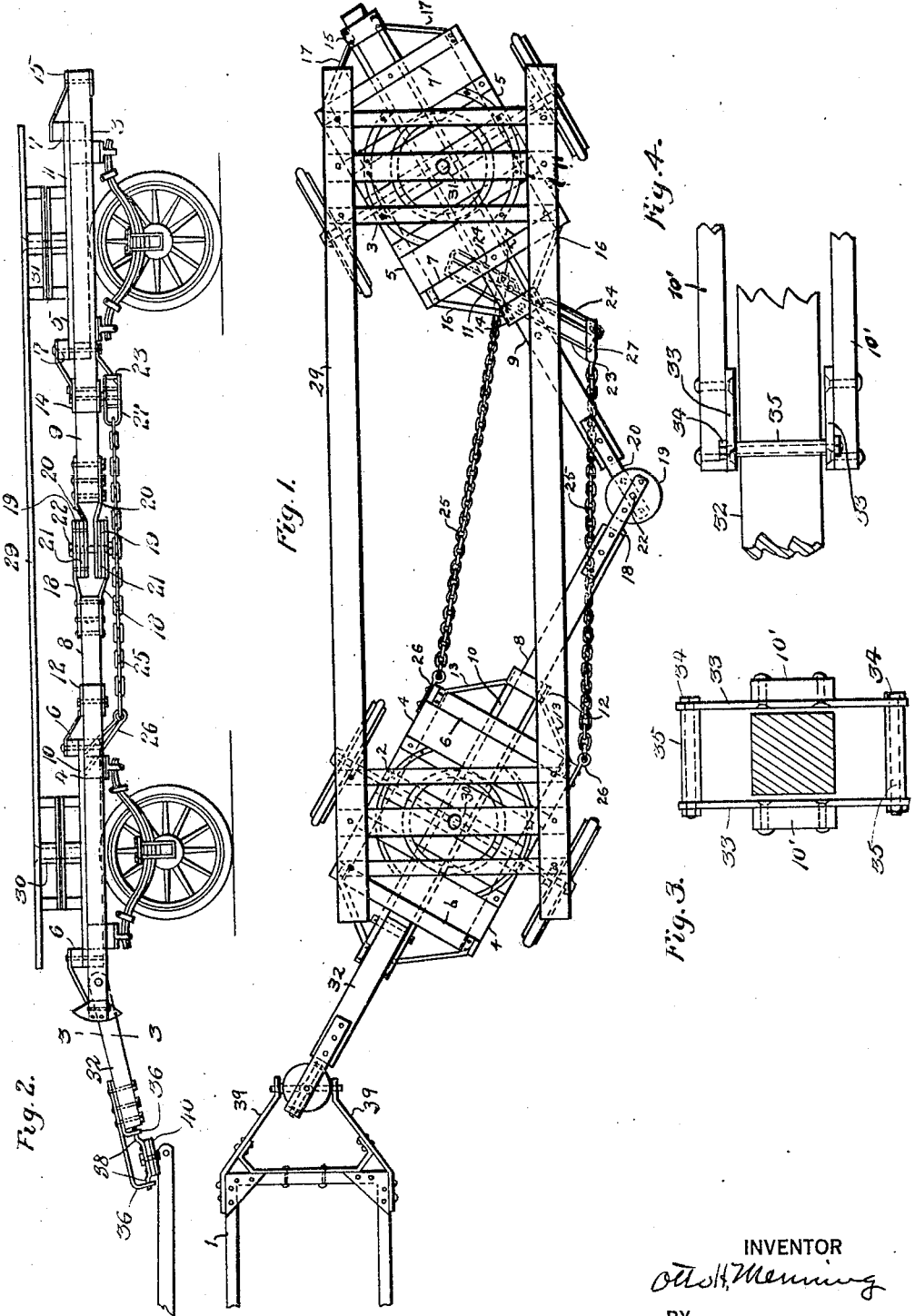

UNITED STATES PATENT OFFICE.

OTTO H. MENNING, OF HOUSTON, TEXAS.

VEHICLE.

1,308,636.  Specification of Letters Patent.  Patented July 1, 1919.

Application filed May 20, 1918. Serial No. 235,659.

*To all whom it may concern:*

Be it known that I, OTTO H. MENNING, a citizen of the United States, residing at Houston, in the county of Harris and State of Texas, have invented certain new and useful Improvements in Vehicles, of which the following is a specification.

This invention relates to new and useful improvements in a vehicle.

The object of the invention is to provide a vehicle of the character described which is adapted for use in carrying heavy loads, and in its preferable form, embodies a truck, and one or more trailers, flexibly connected thereto. In case more than one trailer is used, said trailers are flexibly connected together, the flexible connections embodying improved features more specifically described hereinafter.

Another object of the invention is to provide a vehicle of the character described which is adapted for carrying heavy loads, and which at the same time is so constructed that it may be readily turned around on small space, and will readily follow the bends and turns in traversing a crooked road, and the turning of corners.

A still further feature of the invention resides in the provision of a vehicle constructed of units, connected together, by means of flexible couplings, which will readily yield when the vehicle is passing over a rough or uneven road surface without twisting or injuring said couplings or other parts of the vehicle.

With the above and other objects in view the invention has particular relation to certain novel features of construction, operation and arrangement of parts, an example of which is given in this specification and illustrated in the accompanying drawings, wherein:

Figure 1, is a plan view of the vehicle, showing a truck and two trailers connected thereto.

Fig. 2, is a side elevation thereof.

Fig. 3, is a sectional view, taken on the line 3—3 of Fig. 2.

Fig. 4, is a fragmentary plan view, showing the connection of the front trailer to the truck.

Fig. 5, shows a fragmentary plan view of a single trailer, and

Fig. 6, shows a fragmentary side elevation thereof.

Referring now more particularly to the drawings, wherein like numerals of reference designate similar parts in each of the figures, the numeral 1 indicates a truck, the rear end of the frame of which only is shown, and the numerals 2 and 3, respectively, refer to front and rear trailers. Each trailer has a body mounted upon the axle thereof in the usual manner, said bodies consisting of the side members 4, 4, and 5, 5, respectively, which are connected by suitable cross bars 6 and 7. The trailers have the respective coupling poles 8 and 9, which extend through the long bearings 10, and 11, respectively, carried by the bodies of the trailers. The rear end of the front trailer carries a collar 12, which is secured in position by means of the braces 13, 13, and through which the coupling pole 8 extends, and the rear trailer has the front and rear bearings 14 and 15, secured to the front and rear ends of the body, by means of the respective braces 16, 16, and 17, 17, and the coupling pole 9 is slidable through said respective bearings 14, 11, and 15, but the front coupling pole 8 is fixed against lengthwise movement in the bearing 10. The rear end of the coupling pole 8 has the upper and lower straps, 18, 18, secured thereto, which extend out beyond the rear end of the pole, and to the facing sides of the projecting ends are secured the respective circular bearing plates 19, 19, and secured to and extending from the front end of the coupling pole 9 are the straps 20, 20, to the extending ends of which are secured the circular bearing plates 21, 21, which fit against the corresponding plates 19. These plates have alined central bearings through which the pin 22 extends, thus forming a flexible connection between said coupling poles. Underneath the bearing 14, a double tree 23 is pivoted, the ends of which are provided with elongated bearings 24, 24, and the chains 25, 25, are fastened at their forward ends to the staples 26, 26, which are secured to the rear end of the body of the front trailer, one on each side. The rear of these chains have clevises 27, 27, which embrace the respective ends of the double tree and their pins pass through the respective bearings 24, and are provided with antifriction rollers 28.

A load carrying frame 29 is mounted upon the trailer bodies and has its respective ends pivotally connected thereto, by means of the king pins 30 and 31, respectively, in the well known manner.

For the purpose of connecting the front trailer to the truck, I have provided the link 32, whose rear end is pivoted between the forward ends of the side members 10′ 10′, which form the bearing 10. Secured to the front ends of these side members are the arcuate plates 33, 33, which are spaced apart, forming the bearing through which the link 32 extends, said bearing permitting the vertical movement of the link but holding it firmly against lateral movement. The upper and the lower ends of the plates are secured together by means of the bolts 34, 34, which pass through the respective pipe sections 35, 35, interposed between said plates and against the ends of which the respective plates rest. The forward end of the link 32 has the bearing members 36, 36, secured thereto, and arranged in alinement, one in front of the other. The numeral 37 designates the circular bearing plate to the upper side of which a strap is secured whose ends are formed into spindles 38, 38, which operate in their respective bearings 36, 36. The rear end of the trailer body 1, carries the bearings 39, 39, which are spaced apart, and in transverse alinement, and a bearing plate 40 is provided upon which the bearing plate 37 rests, said last mentioned plate having the strap 41 secured thereto, whose ends terminate in spindles 42, 42, which operate in the bearings 39. The bearing plates 37 and 40 have alined central bearings to receive the bearing pin 43, upon which said bearing plates operate, thus forming a universal connection between the truck and the trailer attached thereto, forming a flexible connection necessary in passing over rough and uneven road surface, thus imparting great flexibility to the vehicle.

In Figs. 5 and 6, I have shown a single trailer connected to the truck. When a single trailer is used, the coupling pole 8′ is extended forwardly and the bearings 36, 36, are secured to the forward end thereof. The forward end of the chains 25, 25, in this form, are connected to the staples 26′ 26′, which are secured to the truck body, and the rear ends of these chains are connected to the double-tree 23, as herein described, said double-tree being pivotally connected to and supported by the bearing 44, which is carried by the front end of the trailer body, and through which the coupling pole 8′ extends. In going around corners, or in turning around, as illustrated in Fig. 1, the flexible connection uniting the coupling poles 8 and 9 yields, the pole 9 sliding through its bearing 11. The draft chains 25, 25, serve to connect the trailers together, and sustain the pull, while the coupling poles being rigid in themselves, serve to guide the trailers and hold them in their proper relative position in making turns, and the connection of the draft chains to the pivotally mounted double-tree permits said double-tree and chains to accommodate themselves to the different positions of the trailers in following crooked roads, going around curves and in turning around.

What I claim is:

1. A vehicle including front and rear wheels, frames mounted thereon, coupling poles attached to the frames, one of which is fixed, and the other of which is slidable through a bearing in its frame, the adjoining ends of said coupling poles being flexibly connected together, a double tree provided with oblong end bearings, pivoted to one of said frames, draft chains connected at one end to the other frame, and whose other ends are adjustably connected to said bearings.

2. A vehicle including front and rear wheels, frames supported thereby, coupling poles connected to the frames and flexibly connected together, a double-tree having oblong end bearings pivoted to one frame, clevises carried by the double-tree and movable in said bearings lengthwise relative to the double-tree, chains connected at one end to said clevises and at their other ends fastened to the other frame.

3. A vehicle including a truck, a trailer connected thereto, by means of a universal coupling, a double-tree pivoted to the trailer and having oblong end bearings, draft chains fastened at one end to the truck body, and means movable lengthwise relative to the double-tree in said bearings, to which the other ends of the chain are attached.

4. A vehicle including a truck, a pair of trailers connected thereto, a flexible connection by means of which the front trailer is attached to the truck, coupling poles carried by the trailer frames and flexibly connected together, one of said coupling poles being secured in its frame and the other being slidably mounted in its frame, a double-tree pivotally secured to the last mentioned frame, draft chains attached at one end to said double-tree by means which are movable lengthwise, relative thereto, and the other ends of said chains being secured to the other frame.

In testimony whereof I have signed my name to this specification in the presence of two subscribing witnesses.

OTTO H. MENNING.

Witnesses:
J. C. BAILEY,
E. V. HARDWAY.